United States Patent
Alber (10) Patent No.: US 12,365,456 B1
(45) Date of Patent: Jul. 22, 2025

(54) THRUSTER SYSTEM FOR A CONVERTIBLE AIRCRAFT

(71) Applicant: Lockheed Martin Corporation, Bethesda, MD (US)

(72) Inventor: Mark R. Alber, Stratford, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 18/602,907

(22) Filed: Mar. 12, 2024

(51) Int. Cl.
  *B64C 11/32* (2006.01)
  *B64C 27/30* (2006.01)
  *B64C 29/00* (2006.01)

(52) U.S. Cl.
  CPC ........ *B64C 29/0025* (2013.01); *B64C 11/325* (2013.01); *B64C 27/30* (2013.01)

(58) Field of Classification Search
  CPC .... B64C 29/0025; B64C 11/325; B64C 27/30
  See application file for complete search history.

(56) References Cited

U.S. PATENT DOCUMENTS

| | | | |
|---|---|---|---|
| 9,550,567 B1* | 1/2017 | Erdozain, Jr. | B64U 30/16 |
| 9,821,909 B2* | 11/2017 | Moshe | B64C 27/22 |
| 9,834,305 B2* | 12/2017 | Taylor | B64U 20/70 |
| 10,183,746 B2 | 1/2019 | Mccullough et al. | |
| 10,556,680 B2 | 2/2020 | Fenny et al. | |
| 10,597,164 B2* | 3/2020 | Oldroyd | G05D 3/00 |
| 11,603,194 B2 | 3/2023 | Mccullough et al. | |
| 11,932,387 B2* | 3/2024 | Wittmaak, Jr. | B64C 29/0033 |
| 2022/0169380 A1 | 6/2022 | Mehrgan | |

* cited by examiner

*Primary Examiner* — Brian M O'Hara
(74) *Attorney, Agent, or Firm* — Michael Best & Friedrich LLP (57) ABSTRACT

A convertible aircraft is configured to fly in a hover mode and a forward flight mode, the aircraft including a body defining a longitudinal axis and a thruster system coupled to the body and configured to apply forces to the body to fly the aircraft. The thruster system includes a first thruster configured to create a first thrust profile having a fixed direction and a variable amount. The thruster system includes a second thruster configured to create a second thrust profile having a variable direction and a variable amount. The thruster system is configured to operate in a first mode and a second mode. In the first mode, the first thrust profile and the second thrust profile are positive, and in the second mode, the first thrust profile is minimized and the second thrust profile is positive.

18 Claims, 6 Drawing Sheets

THRUSTER SYSTEM FOR A CONVERTIBLE AIRCRAFT

FIELD OF INVENTION

Embodiments described herein relate to thruster systems for flying a convertible aircraft, and specifically thruster systems including rotating blades.

BACKGROUND

Aircrafts, and specifically vertical take-off and landing (VTOL) aircrafts, utilize thrusters to provide lift and thrust. Typically, a convertible VTOL aircraft, such as a tiltrotor, tail-sitter, or tiltwing aircraft, can become airborne from a relatively confined space and includes thrusters that provide lift and thrust during take-off, hover, and forward flight states. The thrusters may include a blade assembly with variable pitch controlled by a pitch control system.

SUMMARY

Embodiments described herein provide a tail-sitter aircraft including a body having a fuselage extending along a flight axis between a nose and a base, and a wing assembly coupled to the fuselage and extending transverse to the flight axis. The aircraft further includes a pair of tails extending from the body along the flight axis and the aircraft is supported by at least one landing gear extending from the tails when the aircraft is grounded. A thruster system is coupled to the body and is configured to generate forces to fly the aircraft. The thruster system includes a first thruster having a first blade assembly capable of collective pitch control, and a second thruster having a second blade assembly capable of collective pitch control and cyclic pitch control. With the aircraft in a hover mode, the flight axis extends generally upright and the thruster system is operable in a first mode. In the first mode both the first thruster and the second thruster are activated. With the aircraft in a forward flight mode, the flight axis extends generally laterally and the thruster system is operable in the first mode or in a second mode. In the second mode the first thruster is deactivated and the second thruster is activated.

Further embodiments described herein provide a convertible aircraft configured to fly in a hover mode and a forward flight mode. The aircraft includes a body defining a longitudinal axis and a thruster system coupled to the body and configured to apply forces to the body to fly the aircraft. The thruster system includes a first thruster configured to create a first thrust profile having a fixed direction and a variable amount. The thruster system includes a second thruster configured to create a second thrust profile having a variable direction and a variable amount. The thruster system is configured to operate in a first mode and a second mode. In the first mode, the first thrust profile and the second thrust profile are positive, and in the second mode, the first thrust profile is minimized and the second thrust profile is positive.

Further embodiments described herein provide a convertible aircraft including a body, a pair of tails, and a thruster system coupled to the body and configured to generate forces to fly the aircraft in one of a hover mode or a forward flight mode. The body includes a fuselage extending along a flight axis between a nose and a base and a wing assembly coupled to the fuselage and extending transverse to the flight axis. The pair of tails extends from the body along the flight axis and the aircraft is supported by at least one landing gear extending from the tails when the aircraft is grounded. The thruster system includes a first thruster and a second thruster. The first thruster has a collective pitch control and a pair of first blade assemblies coupled to the body on either side of the flight axis, each first blade assembly including a plurality of first blades each rotatable about a blade axis by the collective pitch control. The first blade assembly has a uniform pitch profile adjustable by the collective pitch control to rotate each blade about the blade axis by an equal amount. The first thruster is selectively deactivated during the forward flight mode. The second thruster has a blended pitch control and a pair of second blade assemblies coupled to the body on either side of the flight axis, each second blade assembly including a plurality of second blades each rotatable about a blade axis by the blended pitch control. The second blade assembly has a differential pitch profile adjustable by the blended pitch control to rotate each blade about the blade axis by different amounts.

Other aspects will become apparent by consideration of the detailed description and accompanying drawings.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

Figure 1:
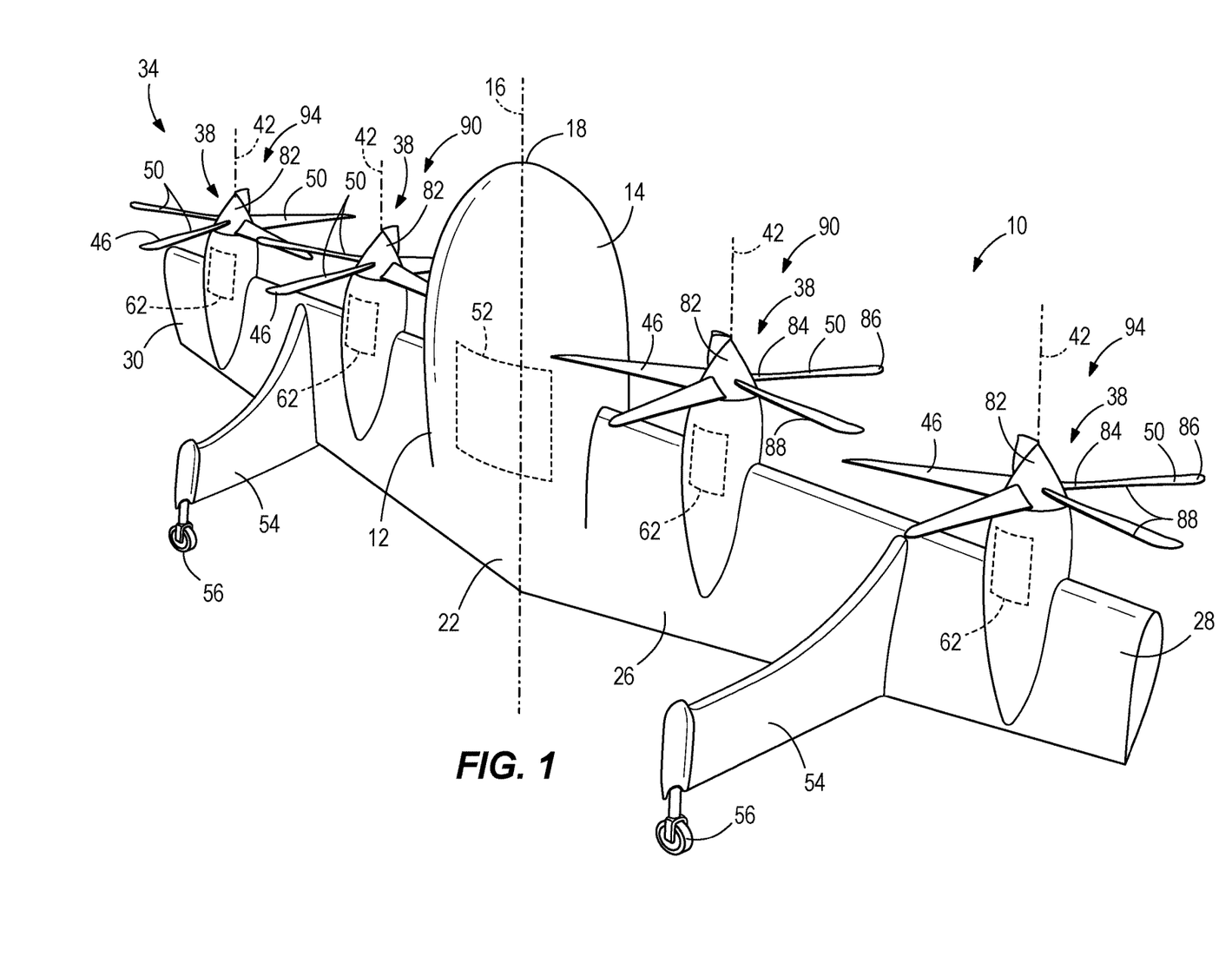
FIG. 1 is a perspective view of an aircraft according to an exemplary embodiment in an upright position, the aircraft including a body and a thruster system coupled thereto.
Figure 2:
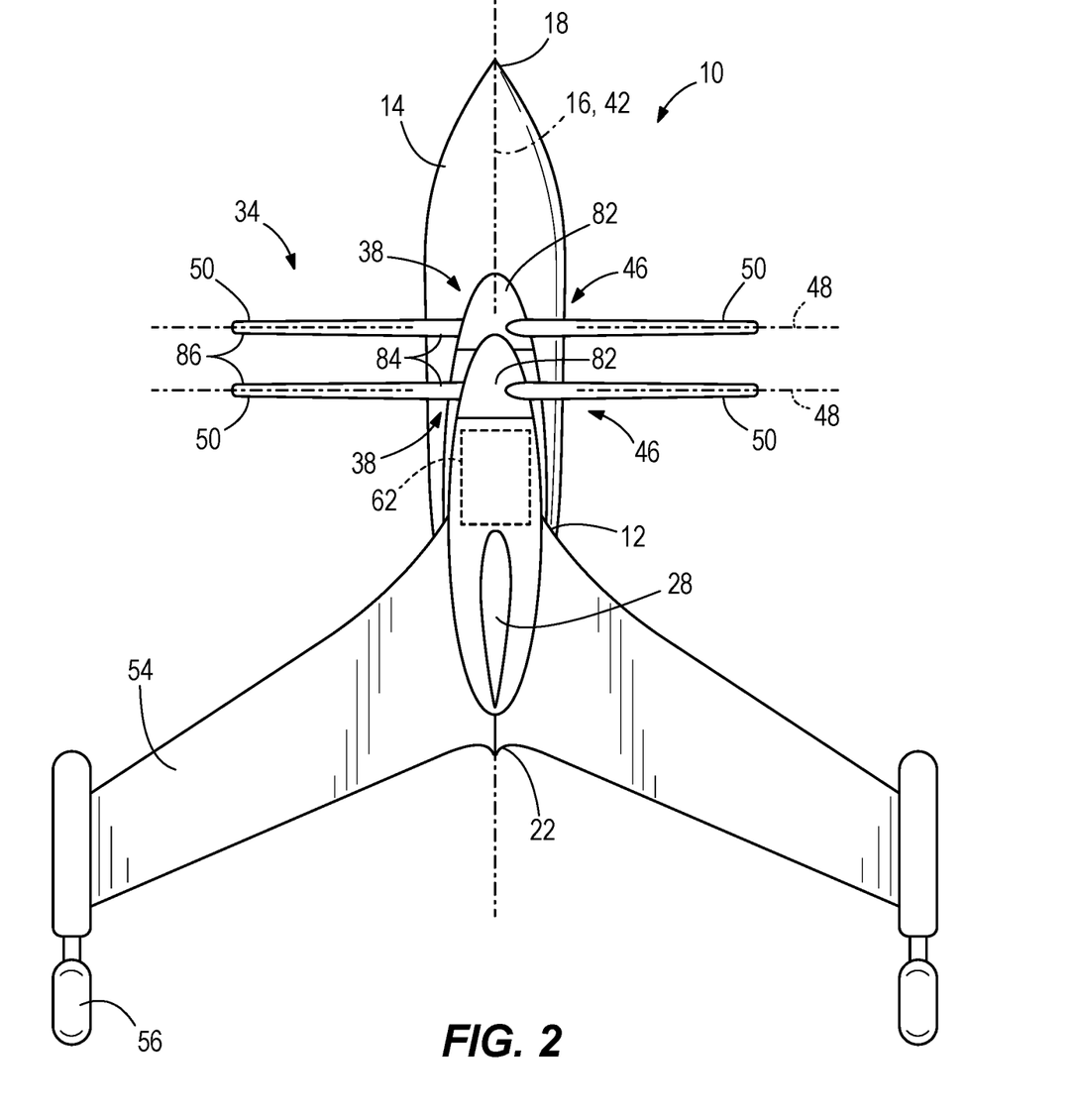
FIG. 2 is a side view of the aircraft of FIG. 1 in the upright orientation.

FIGS. 1 and 2 illustrate a vertical take-off and landing (VTOL) aircraft 10. The aircraft 10 is a convertible aircraft capable of rotor lift flight and wing lift flight. In the illustrated embodiment, the aircraft 10 is a tail-sitter aircraft. The aircraft 10 includes a body 12 having a fuselage 14 extending along a longitudinal axis 16 between a nose 18 and a base 22, and a wing assembly 26 coupled to extend from the fuselage 14 transverse to the longitudinal axis 16, also referred to herein as a flight axis 16. In the illustrated embodiment, the aircraft 10 is symmetrical and the wing assembly 26 includes a first wing 28 and a second wing 30 positioned on an opposite side of the fuselage 14 from the first wing 28.

The aircraft 10 may be referred to using directional terminology including referring to a direction along the longitudinal axis 16 toward the nose 18 as the front and a direction along the longitudinal axis 16 toward the base 22 as the rear. Directions leading away from the longitudinal axis 16 may be referred to as outward or distal and directions leading toward the longitudinal axis 16 may be referred to as inward or proximal. This terminology is not intended to be limiting and is merely used for the sake of description.

With reference to FIG. 1, the aircraft 10 includes a thruster system 34 that generates forces to fly the aircraft 10. In the illustrated embodiment, the thruster system 34 includes multiple thrusters 38 coupled to the wing assembly 26. In this context, a thruster is a component or group of components capable of generating forces and moments to provide the aircraft with a means of thrust, lift, and/or control. In some embodiments, one or more of the thrusters 38 of the thruster system 34 may be coupled to the fuselage 14 or other parts of the body 12.

With continued reference to FIGS. 1 and 2, each thruster 38 includes a blade assembly 46 supported on the body 12 for rotation about a thruster axis 42, also referred to herein as a rotation axis 42. In the illustrated embodiment, the thruster axis 42 is parallel to the longitudinal axis 16 of the aircraft 10. The blade assembly 46 includes a plurality of blades 50 that are rotatable about the thruster axis 42 to generate forces to fly the aircraft 10 (e.g., lift, thrust, etc.). A prime mover 52 is positioned in the aircraft 10 and is connected to thrusters 38 by mechanical and/or electrical connectors to operate the thrusters 38 and rotate the blade assemblies 46. The prime mover 52 may be an engine or other type of generator capable of transmitting rotation to the thrusters 38. In some embodiments, a single prime mover 52 is positioned in the body 12 (e.g., in the fuselage 14) and is coupled to the thruster system 34 to power each of the multiple thrusters 38. In some embodiments, each thruster 38 includes a dedicated prime mover 52 and the prime mover 52 may be positioned within the thruster 38. In some embodiments, the aircraft 10 may have multiple prime movers 52 coupled to multiple thrusters 38 and the prime movers 52 may be located in other placed on the aircraft 10.

With continued reference to FIG. 1, the aircraft 10 includes tail fins 54 extending rearwardly and laterally outwardly from the wing assembly 26 to create a wide base. As referenced above, in the illustrated embodiment of the tail-sitter aircraft 10, the tail fins 54 are each equipped with one or more landing gears 56 configured to engage a ground surface to support the aircraft 10 in an upright orientation when the aircraft 10 is grounded, as shown in FIG. 1. In some embodiments, the landing gears 56 may be retractable and store away during flight. In the illustrated embodiment, the aircraft 10 includes two of the tail fins 54, each shown positioned between the thrusters 38 on each of the wings 28, 30. In other embodiments, the aircraft 10 may include more tail fins 54 and/or the tail fins 54 may be differently positioned on the body 12.

Figure 4A:
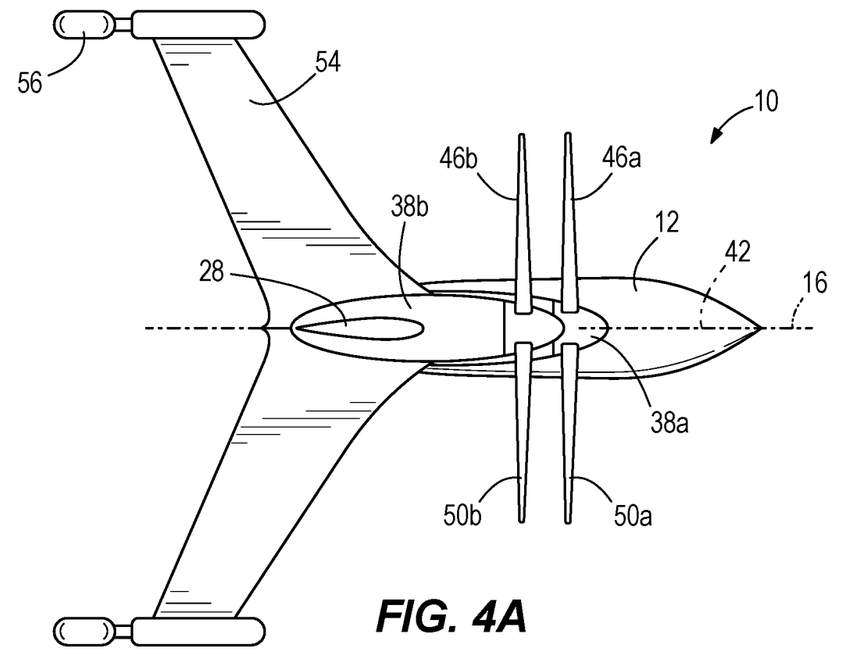
FIG. 4A is a side view of the aircraft of FIG. 1 in a level orientation, with the thruster system in a first mode of operation.
Figure 4B:
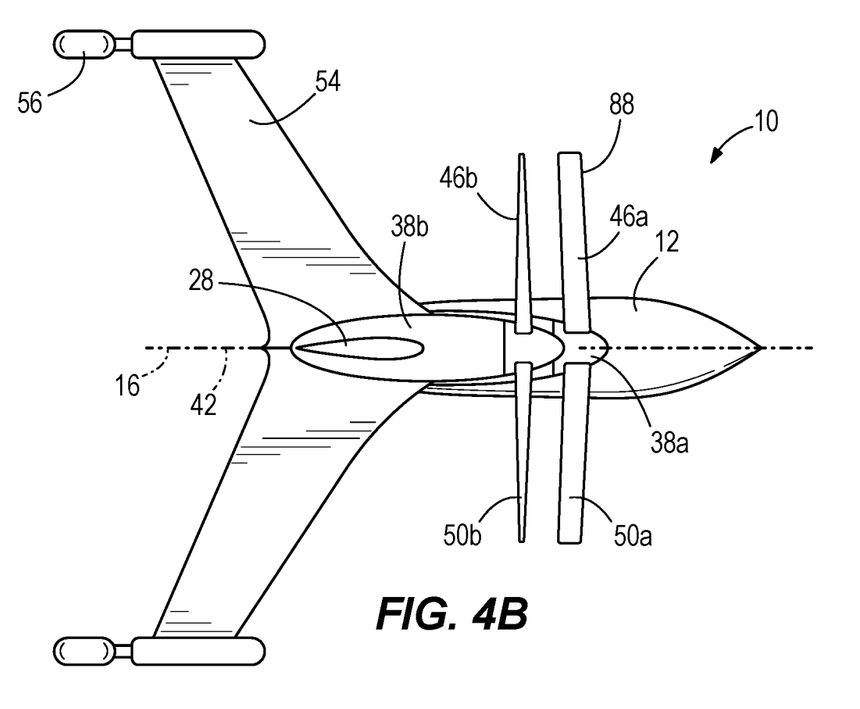
FIG. 4B is a side view of the aircraft of FIG. 1 in the level orientation, with the thruster system in a second mode of operation.
Figure 5A:
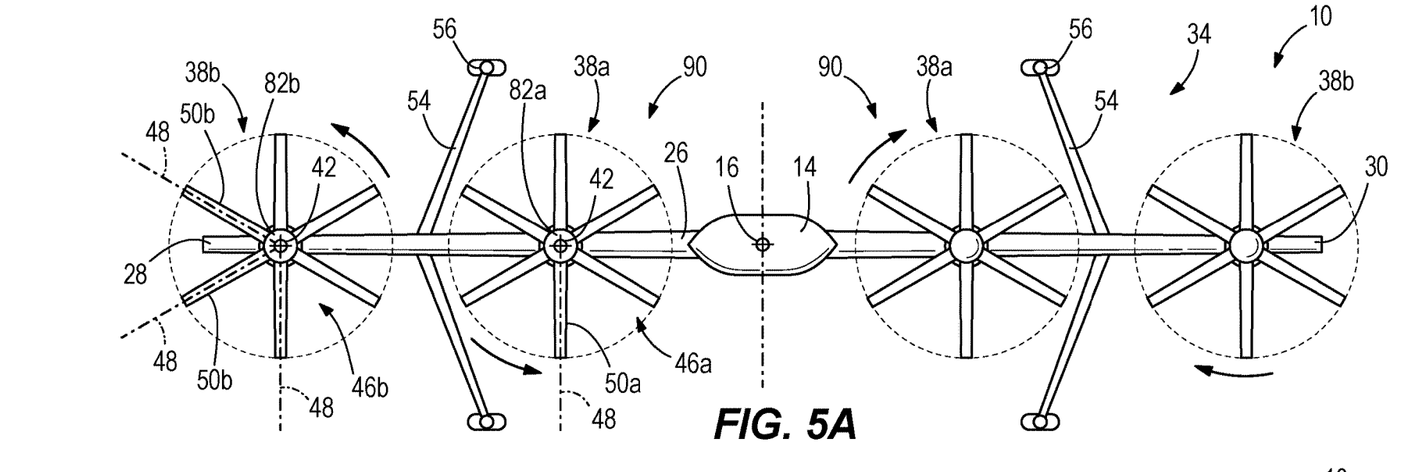
FIG. 5A is a front view of the aircraft of FIG. 1 in the level orientation, with the thruster system in the first mode of operation.
Figure 5B:
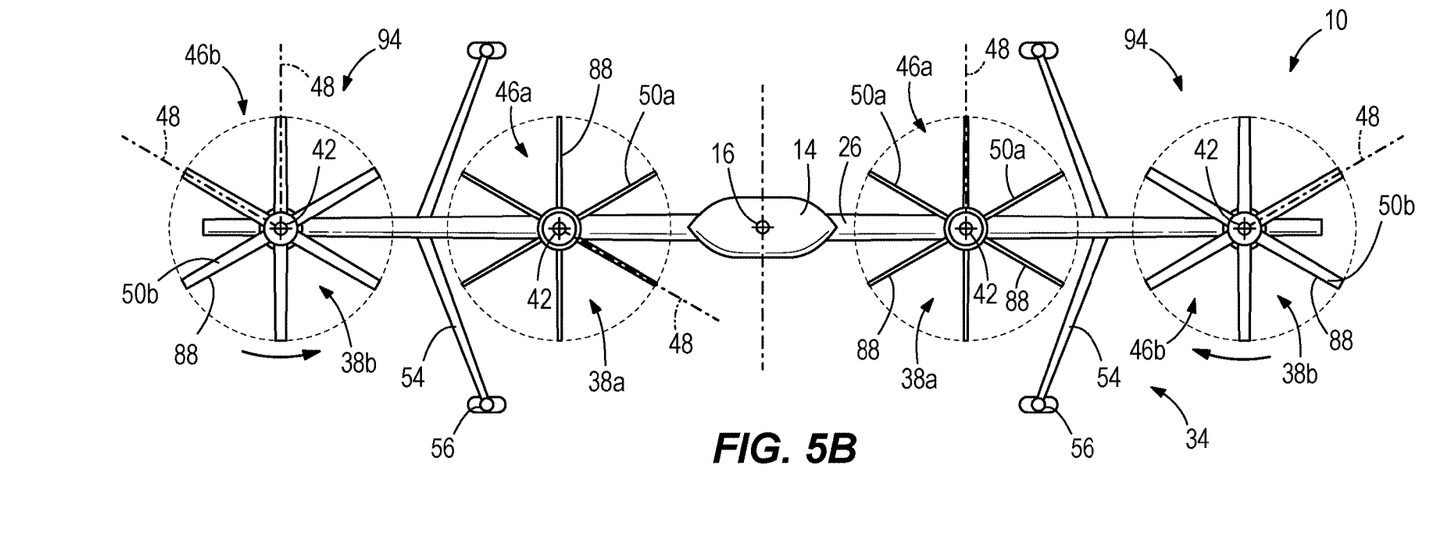
FIG. 5B is a front view of the aircraft of FIG. 1 in the level orientation, with the thruster system in the second mode of operation.

The aircraft 10 is operable in a first mode, also referred to herein as a hover mode, and a second mode, also referred to herein as a forward flight mode. In the hover mode, the aircraft 10 is in the upright orientation (FIGS. 1-3) and the longitudinal axis 16 extends generally vertically. The thruster system 34 may be operated to provide lift and thrust to allow the aircraft 10 to take off and land vertically, and to fly above the ground in the upright orientation. In the hover mode, the thrusters 38 provide all or almost all of the lift and thrust to the aircraft 10. In the forward flight mode, the aircraft 10 is in a level orientation (FIGS. 4A-4B) and the longitudinal axis 16 extends near horizontally. In the forward flight mode, the thruster system 34 may be operated to provide additional thrust and balance to the aircraft 10 with the majority of the lift applied to the aircraft 10 being generated by the wing assembly 26. The wing assembly 26 includes an airfoil profile that generates lift when the aircraft 10 is in the level position. In the illustrated embodiment, the aircraft 10 is illustrated in the level position with the first wing 28 to the left of the fuselage (see FIG. 5A) and the second wing 30 to the right of the fuselage (see FIG. 5B) when looking rearwardly along the flight axis 16. In other embodiments, the wing assembly 26 may be differently configured such that the first wing 28 may instead be on the right side of the fuselage 14 in the level orientation. The thrusters 38 on the first wing 28 rotate counterclockwise and the thrusters 38 on the second wing 30 rotate clockwise. In other embodiments, the direction of rotation of the thrusters 38 may be differently configured, based on the inboard/outboard position of the thruster 38 or based on other reasons.

With reference to FIGS. 1 and 2, the thrusters 38 are variable pitch thrusters that vary the force provided to the aircraft 10 by changing a pitch of the blade assembly 46. The pitch of the blade assembly 46 is controlled by an associated pitch control system 62. The blade assembly 46 includes the blades 50 and a rotor hub 82 for supporting the blades 50. The rotor hub 82 is driven to rotate about the thruster axis 42 by the prime mover 52 (e.g., through a gearbox and shaft) and rotates the blades 50 about the thruster axis 42 therewith. The blades 50 are evenly spaced about the rotor hub 82. Each blade 50 extends along a blade axis 48 between a base end 84 adjacent the rotor hub 82 and a distal end 86. Each blade 50 is supported on the rotor hub 82 for rotation about its respective blade axis 48. The blade assembly 46 is illustrated schematically in the included figures, and thus the specific profiles, relative sizes and dimensions, and 3D configurations (such as twist) of the blades 50 and the blade assembly 46 are not limited to those shown in the figure.

As discussed above, the blade assembly 46 has a variable pitch profile that controls the direction and amount of the force generated by the blade assembly 46. The pitch profile is an aggregate of individual blade pitches of each blade 50. The blade pitches are adjusted by rotating the blade 50 about the blade axis 48. The pitch profile is controlled by the pitch control system 62. In some embodiments, the pitch control system 62 is coupled to each blade 50 to control and adjust the rotational position of the blade 50 about the blade axis 48.

Figure 3:
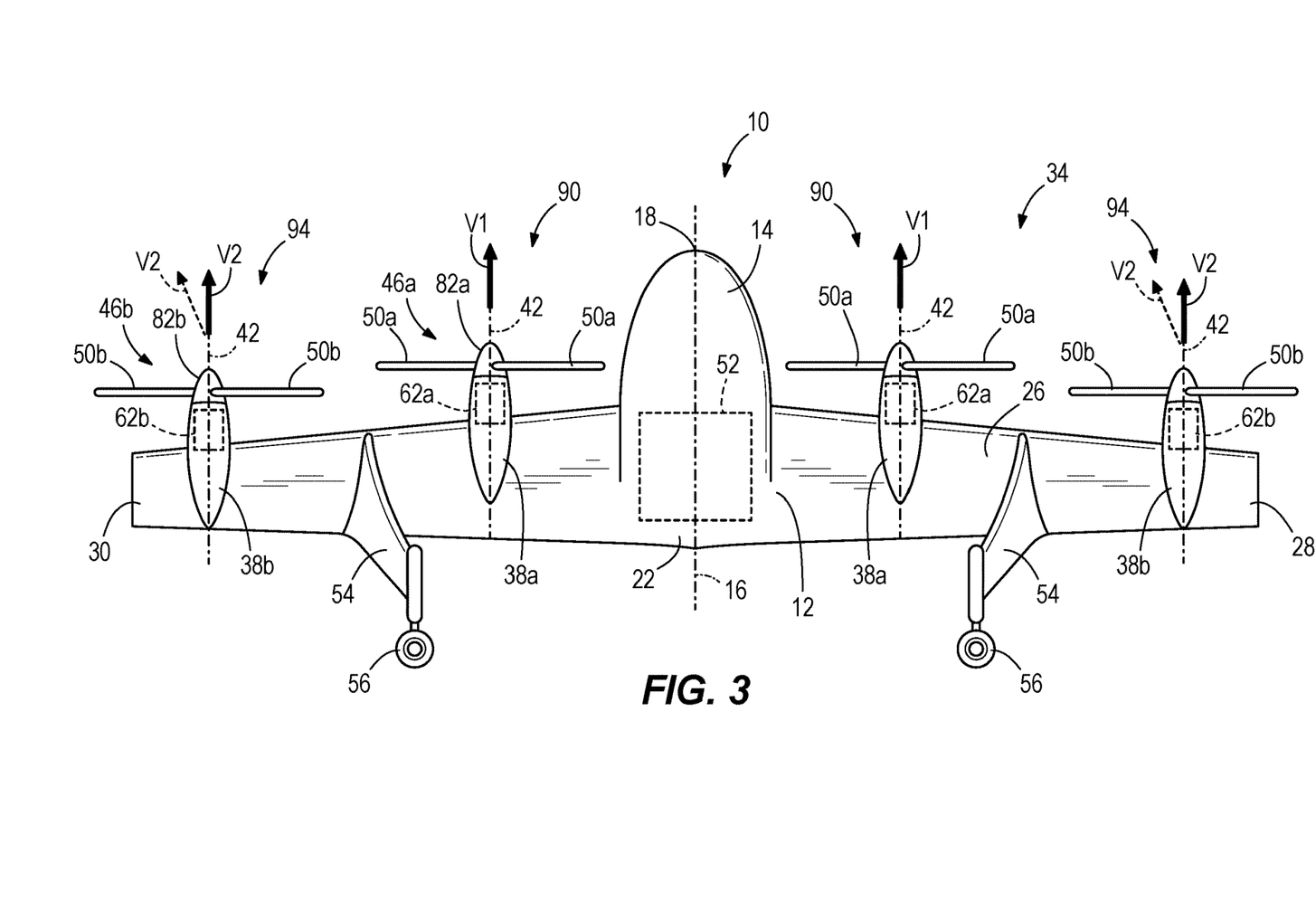
FIG. 3 is a front view of the aircraft of FIG. 1 in the upright orientation.

With reference to FIG. 3, the thruster system 34 of the aircraft 10 includes a first thruster subsystem 90 and a second thruster subsystem 94. The first thruster subsystem 90 includes a first type of thruster 38, referred to herein as a propeller 38a. The second thruster subsystem 94 includes a second type of thruster 38, referred to herein as a rotor 38b. In the illustrated embodiment, the first thruster subsystem 90 includes a pair of the propellers 38a supported on the body 12 on opposite sides of the longitudinal axis 16. Similarly, the second thruster subsystem 94 includes a pair of the rotors 38b supported on the body 12 on opposite sides of the longitudinal axis 16. Thus, the first wing 28 includes one of the rotors 38b adjacent an outboard end of the first wing 28 and one of the propellers 38a adjacent the fuselage 14. The second wing 30 mirrors the first wing 28 and similarly includes one of the rotors 38b outboard of one of the propellers 38a. In some embodiments, the number of rotors 38b in the first thruster subsystem 90, the number of propellers 38a in the second thruster subsystem 94, and the position and layout of the thruster system 34 may be varied. For example, in some embodiments, the layout of the thruster system 34 may be reversed such that the rotors 38b may be positioned inboard of the propellers 38a.

With continued reference to FIG. 3, turning to the first thruster subsystem 90, the propellers 38a include a first pitch control system 62a operable to change the pitch of a first blade assembly 46a collectively (i.e., capable of collective pitch control). In the collective pitch change, each of a plurality of first blades 50a is rotated about its blade axis 48 by an equal amount such that the blade pitch of each first blade 50a is uniformly varied. Therefore, the pitch profile of the first blade assembly 46a is always a uniform pitch profile in which the blade pitches of the first blades 50a are equal. The propeller 38a applies a force generated by rotation of the first blade assembly 46a to the body 12 to fly the aircraft 10. Specifically, the propeller 38a generates a first thrust vector V1 applied to the aircraft 10. The first thrust vector V1, also referred to herein as a first thrust profile, has a variable amount and a fixed direction, controlled by the pitch profile of the first blade assembly 46a. Collectively changing the pitch of the first blade assembly 46a causes the amount of thrust in the first thrust vector V1 to increase. Since the first blade assembly 46a always has a uniform pitch profile, the thrust vector V1 is always aligned with the thruster axis 42. Therefore, the force is applied along the longitudinal axis 16 and, when the thrust vector V1 is positive, the force propels the aircraft 10 forward.

Figure 6A:
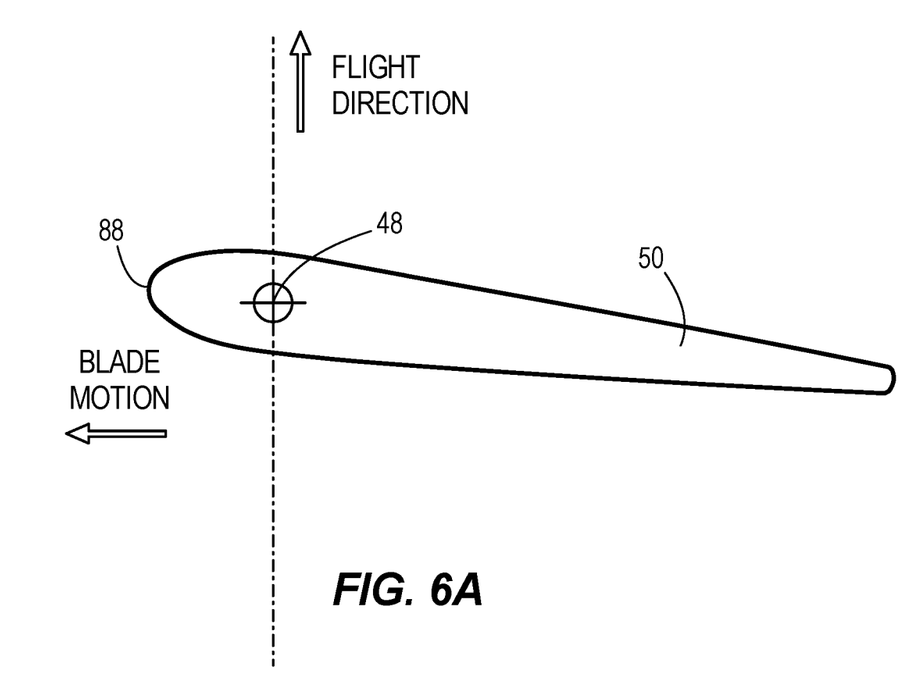
FIG. 6A schematically illustrates a cross section of a blade of the thruster system of the aircraft of FIG. 1, with the blade in a first position.
Figure 6B:
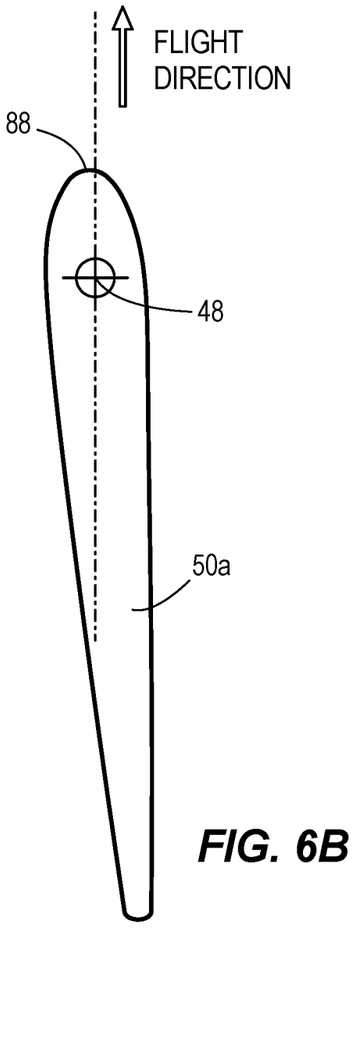
FIG. 6B schematically illustrates the cross section of the blade of the thruster system of the aircraft of FIG. 1, with the blade in a second position.

During operation of the propeller 38a, the prime mover 52 rotates the first rotor hub 82a to drive the first blade assembly 46a about the thruster axis 42. The first pitch control system 62a operates in response to input from a flight control system to collectively adjust the pitch profile of the first blade assembly 46a by rotating the first blades 50a in unison about their blade axis 48 within a range of operating positions (FIG. 6A). The amount of force in the thrust vector V1 varies within a positive range in response to the pitch adjustments to propel the aircraft 10 forward.

With continued reference to FIG. 3, turning to the second thruster subsystem 94, the rotors 38b include a second pitch control system 62b operable to change the pitch of a second blade assembly 46b collectively (i.e., capable of collective pitch control) and to change the pitch of the second blade assembly 46b cyclically (i.e., capable of cyclic pitch control). The second pitch control system 62b may be referred to as a combined or blended pitch control system. In the collective pitch change, each of a plurality of second blades 50b is rotated about its blade axis 48 by an equal amount such that the blade pitch of each second blade 50b is uniformly varied. In a cyclic pitch change, each of the second blades 50b is rotated about the blade axis 48 by a different amount based on the respective circumferential position of the second blade 50b about a second rotor hub 82b, such that the blade pitch of each second blade 50b varies differentially. In other words, the blade pitch of some of the second blades 50b are different than the blade pitch of other of the second blades 50b. Therefore, the pitch profile of the second blade assembly 46b may be a differential pitch profile in which the blade pitches of the second blades 50b are not uniform.

The rotor 38b applies a force generated by rotation of the second blade assembly 46b to the body 12 to fly the aircraft 10. Specifically, the rotor 38b generates a second thrust vector V2 applied to the aircraft 10. The second thrust vector V2, also referred to herein as a second thrust profile, has a variable amount and a variable direction, controlled by the pitch profile of the second blade assembly 46b. Collectively changing the pitch of the second blade assembly 46b causes the amount of thrust in the second thrust vector to increase. Cyclically changing the pitch of the second blade assembly 46b causes the direction of the thrust in the second thrust vector to change. When the second blade assembly 46b has a uniform pitch profile (meaning the blade pitch of each second blade 50b is equal), the thrust vector is aligned with the thruster axis 42 and thus, the force is applied along the longitudinal axis 16, propelling the aircraft 10 forward. When the second blade assembly 46b has a differential pitch profile (meaning the blade pitches of the second blades 50b are unequal), the thrust vector V2 extends obliquely to the thruster axis 42, as illustrated by the dashed arrow in FIG. 3, and the force is applied to the aircraft 10 obliquely to the longitudinal axis 16, steering the aircraft 10. In other words, the thrust vector V2 is tiltable with respect to the thruster axis 42. Even when the thrust vector extends off-axis, a component of the thrust vector is along the longitudinal axis 16. Therefore, when the thrust vector V2 is positive, the force propels the aircraft 10 forward (in the flight direction) as well as steering the aircraft 10.

During operation of the rotor 38b, the prime mover 52 rotates the second rotor hub 82b to drive the second blade assembly 46b about the thruster axis 42. The second pitch control system 62b operates in response to input from a flight control system to collectively and/or cyclically adjust the pitch profile of the second blade assembly 46b by rotating the second blades 50b about their blade axis 48 within a range of operating positions. The amount of force in the thrust vector V2 varies within a positive range in response to the pitch adjustments to propel the aircraft 10 forward and steer the aircraft 10.

With reference to FIGS. 4A-6B, the first thruster subsystem 90 can be selectively deactivated to decrease drag and increase efficiency. The thruster system 34 is operable in a first mode, also referred to herein as a high-speed mode, and a second mode, also referred to herein as an efficient cruise mode. In the first mode, shown in FIGS. 4A and 5A, the first thruster subsystem 90 and the second thruster subsystem 94 are both activated such that all the thrusters 38 apply a force to the aircraft 10 and all the thrust vectors V1, V2 are positive. In the second mode, shown in FIGS. 4B and 5B, the first thruster subsystem 90 is deactivated so that the propellers 38a are shut down and the thrust vectors V1 are minimized (i.e., decreased to zero or near zero). When the propellers 38a are shut down, rotation of the first rotor hub 82a and the first blade assembly 46a is stopped. In some embodiments, the first blade assembly 46a may be fixed to prevent rotation about the thruster axis 42. The first blade assembly 46a is feathered to decrease and minimize drag. Feathering the first blade assembly 46a includes rotating each first blade 50*a* about the blade axis 48 to a feathered position (FIG. 6B), in which a leading edge 88 of the first blade 50*a* is pointed forward (in the flight direction) along the longitudinal axis 16. In some embodiments, each first blade 50*a* is actuated and held in the feathered position by the first pitch control system 62*a*. In some embodiments, the first blades 50*a* may be driven to the feathered position by the airstream passing through the first blade assembly 46*a* as the aircraft 10 flies.

During operation, the aircraft 10 can be operated in the hover mode during take-off, landing, and hover flight operations. In the hover mode, the aircraft 10 is in the upright orientation and the thruster system 34 is operated in the first mode, with all the thrusters 38 activated. The aircraft 10 can be converted and operated in a forward flight mode during cruising flight operations. In forward flight mode, the aircraft 10 is in the level orientation and the thruster system 34 may be operated in the first mode or in the second mode. In other words, the first thruster subsystem 90 can be selectively deactivated when the aircraft 10 is in the forward flight mode. When the aircraft 10 is operated in forward flight mode and the thruster system 34 is in the first mode, the aircraft 10 may travel at a first cruise speed relative to the ground. When the aircraft 10 is operated in the forward flight mode and the thruster system 34 is in the second mode, the aircraft 10 may travel at a second cruise speed relative to the ground that is less than the first cruise speed. The first mode of the thruster system 34 may be used to travel large distances quickly, or in situations where high speed is required. The second mode of the thruster system 34 may be used when the aircraft 10 arrives at a destination and less speed is required (for example, during a surveying flight operation).

The aircraft 10 is therefore advantageously convertible between hover mode and forward flight mode, as well as between high speed and efficient modes. The efficient mode of the thruster system 34 allows the aircraft 10 to conserve energy by shutting down the propellers 38*a* and feathering the first blade assembly 46*a* to decrease drag (decreasing the required forces to fly the aircraft 10).

Propellers 38*a* (e.g., thrusters without cyclic control) are lighter and simpler and able to efficiently shut down when not needed. Because the first pitch control system 62*a* is less complex, the propellers 38*a* are better suited to feathering during flight since it is easier to fix the first blades 50*a* in the feathered position and reduce drag. However, propellers 38*a* offer less precise control during flight for steering operations. Rotors 38*b* (e.g., thrusters with cyclic control) are better suited to precise control for steering the aircraft 10, but are more complex, heavier, and not easily shut down when not needed. Previous aircrafts have used all propellers 38*a*, providing efficient and lightweight thruster system, or have used all rotors 38*b*, providing a precise and maneuverable thruster system. The present aircraft 10 combines the advantages of each by positioning the rotors 38*b* at the wing tips to provide the most control and positioning the propellers 38*a* in board to provide additional thrust when needed or be deactivated when not needed, maximizing efficiency without sacrificing control.

Embodiments disclosed herein are primarily for exemplary purposes. It should be understood that alternative embodiments or various combinations of features described herein may be implemented.

Various features and advantages of the embodiments described herein are set forth in the following claims.

What is claimed is:

1. A tail-sitter aircraft comprising:
 a body including a fuselage extending along a flight axis between a nose and a base, and a wing assembly coupled to the fuselage and extending transverse to the flight axis;
 a pair of tails extending from the body along the flight axis, wherein the aircraft is supported by at least one landing gear extending from the tails when the aircraft is grounded; and
 a thruster system coupled to the body and configured to generate forces to fly the aircraft, the thruster system including
  a first thruster having a first blade assembly capable of collective pitch control, and
  a second thruster having a second blade assembly capable of collective pitch control and cyclic pitch control;
 wherein in a hover mode of the aircraft the flight axis extends generally upright and the thruster system is operable in a first mode where both the first thruster and the second thruster are activated,
 wherein in a forward flight mode of the aircraft the flight axis extends generally laterally and the thruster system is operable in the first mode or in a second mode, wherein in the second mode the first thruster is deactivated and the second thruster is activated.

2. The tail-sitter aircraft of claim 1, wherein in the second mode the first blade assembly is feathered to decrease drag.

3. The tail-sitter aircraft of claim 1, wherein the first blade assembly is supported on the body to rotate about a thruster axis extending parallel to the flight axis, the first blade assembly including a plurality of first blades.

4. The tail-sitter aircraft of claim 3, wherein:
 each first blade extends along a blade axis and is supported for rotation about the blade axis,
 each first blade is rotatable about the blade axis to vary an amount of force generated by the first blade and applied to the aircraft, and
 collective pitch control of the first blade assembly includes rotating each of the plurality of first blades about the blade axis in unison.

5. The tail-sitter aircraft of claim 4, wherein:
 in the first mode the first blade assembly is driven to rotate about the thruster axis and each first blade is rotatably positioned so the amount of force generated by the first blade assembly is positive, and
 in the second mode the first blade assembly is fixed against rotation about the thruster axis and each first blade is rotated about the blade axis to a feathered position in which the amount of the force generated is decreased to near zero.

6. The tail-sitter aircraft of claim 3, wherein the first blade assembly is one of a pair of first blade assemblies and the first blade assemblies are supported on the body on opposite sides of the flight axis, and wherein the second blade assembly is one of a pair of second blade assemblies and the second blade assemblies are supported on the body on opposite sides of the flight axis.

7. The tail-sitter aircraft of claim 3, wherein:
 in the first mode, the first blade assembly is rotated about the thruster axis and the collective pitch control moves the plurality of first blades to an operating position, and
 in the second mode, the first blade assembly is fixed against rotation about the thruster axis and the collective pitch control moves the plurality of first blades to a feathered position.

8. The tail-sitter aircraft of claim 1, wherein:
the collective pitch control varies an amount of a force applied to the aircraft by the first thruster, and
the first thruster applies force to the aircraft in a fixed direction, and
the fixed direction is parallel to a thruster axis of the first thruster.

9. The tail-sitter aircraft of claim 1, wherein the first thruster is configured to apply a first force to the aircraft along a first thruster axis, and wherein in the first mode the first force is positive and in the second mode the first force is near zero.

10. The tail-sitter aircraft of claim 9, wherein the second thruster is configured to apply a second force to the aircraft, and wherein the collective pitch control varies an amount of the second force and the cyclic pitch control varies a direction of the second force, and wherein during the second mode, the second thruster applies the second force to the aircraft to steer the aircraft.

11. A convertible aircraft configured to fly in a hover mode and a forward flight mode, the aircraft comprising:
a body defining a longitudinal axis; and
a thruster system coupled to the body and configured to apply forces to the body to fly the aircraft, the thruster system including
a first thruster configured to create a first thrust profile having a fixed direction and a variable amount, wherein the first thruster includes first blades and wherein each first blade has a blade pitch configured to vary, and wherein the blade pitch of each first blade is equal to the others to create a uniform pitch profile;
a second thruster configured to create a second thrust profile having a variable direction and a variable amount;
wherein the thruster system is configured to operate in a first mode and a second mode, and wherein in the first mode, the first thrust profile and the second thrust profile are positive, and wherein in the second mode, the first thrust profile is minimized and the second thrust profile is positive, and wherein in the second mode the blade pitch of each first blade is adjusted to zero.

12. The convertible aircraft of claim 11, wherein in the hover mode the thruster system is operable in the first mode, and wherein in the forward flight mode the thruster system is operable in both the first mode and the second mode.

13. The convertible aircraft of claim 11, wherein the second thruster includes second blades and wherein each second blade has a blade pitch configured to vary, and wherein the blade pitches of the second blades are different to create a differential pitch profile.

14. The convertible aircraft of claim 11, wherein when the aircraft is in the forward flight mode the aircraft may travel at a cruise speed relative to a ground, and wherein when the thruster system is in the second mode, the cruise speed may be less than the cruise speed of the aircraft with the thruster system in the first mode.

15. A convertible aircraft comprising:
a body including a fuselage extending along a flight axis between a nose and a base, and a wing assembly coupled to the fuselage and extending transverse to the flight axis;
a pair of tails extending from the body along the flight axis, wherein the aircraft is supported by at least one landing gear extending from the tails when the aircraft is grounded; and
a thruster system coupled to the body and configured to generate forces to fly the aircraft in one of a hover mode or a forward flight mode, the thruster system including
a first thruster having a collective pitch control and a pair of first blade assemblies coupled to the body on either side of the flight axis, each first blade assembly including a plurality of first blades each rotatable about a blade axis by the collective pitch control, the first blade assembly having a uniform pitch profile adjustable by the collective pitch control to rotate each blade about the blade axis by an equal amount, wherein the first thruster is selectively deactivated during the forward flight mode;
a second thruster having a blended pitch control and a pair of second blade assemblies coupled to the body on either side of the flight axis, each second blade assembly including a plurality of second blades each rotatable about a blade axis by the blended pitch control, the second blade assembly having a differential pitch profile adjustable by the blended pitch control to rotate each blade about the blade axis by different amounts.

16. The convertible aircraft of claim 15, wherein the first thruster applies a first force to the body in a first direction, and wherein the first direction is fixed to be along a rotation axis of the first blade assembly.

17. The convertible aircraft of claim 15, wherein the second thruster applies a second force to the body in a second direction, and wherein the second direction is tiltable with respect to a rotation axis of the second blade assembly.

18. The convertible aircraft of claim 15, wherein the first blade assembly is feathered when the first thruster is deactivated.

* * * * *